(12) United States Patent
Ellingboe et al.

(10) Patent No.: US 8,870,136 B2
(45) Date of Patent: Oct. 28, 2014

(54) CLAMP

(75) Inventors: Eric Andrew Ellingboe, Dubuque, IA (US); Daniel R. Schneider, East Dubuque, IL (US); Kerry W. Leppert, Dubuque, IA (US)

(73) Assignee: Playcore Wisconsin, Inc., Chatanooga, TN (US)

( * ) Notice: Subject to any disclaimer, the term of this patent is extended or adjusted under 35 U.S.C. 154(b) by 165 days.

(21) Appl. No.: 13/015,161

(22) Filed: Jan. 27, 2011

(65) Prior Publication Data

US 2012/0193492 A1 Aug. 2, 2012

(51) Int. Cl.
| | |
|---|---|
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *F16B 2/10* | (2006.01) |
| *A63G 31/00* | (2006.01) |
| *A63B 9/00* | (2006.01) |
| *E04B 1/58* | (2006.01) |

(52) U.S. Cl.
CPC .............. *F16B 2/10* (2013.01); *A63B 2009/006* (2013.01); *A63G 31/00* (2013.01); *E04B 1/585* (2013.01)
USPC ................ 248/219.4; 248/230.1; 248/231.61; 403/49; 403/175; 403/230; 403/241

(58) Field of Classification Search
USPC ............. 188/68; 248/58, 62, 65, 69, 73, 74.1, 248/74.3, 74.4, 218.4, 219.2, 229.13, 248/229.23, 228.4, 230.4, 231.51; 403/49, 403/175, 230, 241, 396, 362
See application file for complete search history.

(56) References Cited

U.S. PATENT DOCUMENTS

| | | | |
|---|---|---|---|
| 539,249 A | 5/1895 | Clamer | |
| 555,512 A | 3/1896 | Johnson | |
| 582,170 A | 5/1897 | Brown | |
| 1,344,342 A | 6/1920 | Hansen | |
| 1,547,214 A | 7/1925 | Gooding | |
| 2,676,025 A | 4/1954 | Davis | |
| 2,850,124 A * | 9/1958 | Grote | ........................ 188/251 R |
| 2,850,311 A | 9/1958 | Mansfield | |
| 3,092,407 A | 6/1963 | Blonder | |
| 3,347,110 A * | 10/1967 | Wilson | ............................ 74/397 |
| 3,428,300 A | 2/1969 | Sconzo | |
| 3,524,627 A | 8/1970 | Boyanton et al. | |

(Continued)

*Primary Examiner* — Jonathan Liu
*Assistant Examiner* — Taylor Morris
(74) *Attorney, Agent, or Firm* — McAndrews, Held & Malloy, Ltd.

(57) ABSTRACT

The subject invention is a clamp that has two halves of an annular ring hingedly connected at one end and capable of being securely fastened to each other at the opposite end. The annular ring is sized to fit tightly around a vertical support post. An upper surface of the annular ring has an upper annular channel, while the lower surface of the annular ring has a lower annular channel. When the clamp is fixed to the vertical support post, a horizontal support adaptor may fit into both the upper and lower annular channels. A resilient engagement strip or button on the adaptor is placed into contact with the lower annular channel in this position and frictionally engages the lower annular channel to prevent lateral movement of the adaptor on the annular ring until such time as the adaptor may be securely attached to the annular ring.

13 Claims, 4 Drawing Sheets

(56) References Cited

U.S. PATENT DOCUMENTS

| | | | |
|---|---|---|---|
| 4,381,851 A * | 5/1983 | Kraft | 238/232 |
| 4,619,545 A * | 10/1986 | Kuttenbaum | 403/169 |
| 4,632,221 A | 12/1986 | Stanford | |
| 4,834,431 A | 5/1989 | Calmettes et al. | |
| 4,840,513 A | 6/1989 | Hackett | |
| 4,864,795 A | 9/1989 | Burg | |
| 4,880,195 A | 11/1989 | Lepley | |
| 4,896,454 A | 1/1990 | Cronenwell et al. | |
| 4,915,535 A | 4/1990 | Willetts | |
| 5,078,532 A | 1/1992 | Williams | |
| 5,098,051 A | 3/1992 | Aldridge et al. | |
| 5,184,911 A | 2/1993 | Wu | |
| 5,193,774 A | 3/1993 | Rogers | |
| 5,217,314 A | 6/1993 | Perruelle | |
| 5,531,536 A | 7/1996 | Blanchfield et al. | |
| 5,560,730 A | 10/1996 | Gillard et al. | |
| 5,575,580 A * | 11/1996 | Parrish et al. | 403/49 |
| 5,775,652 A * | 7/1998 | Crawshaw et al. | 248/230.6 |
| 5,785,447 A | 7/1998 | Fonti et al. | |
| 5,961,240 A | 10/1999 | Bobrovniczky | |
| 6,481,684 B1 * | 11/2002 | Farmer et al. | 248/309.3 |
| 6,481,912 B2 | 11/2002 | Shih | |
| 6,575,652 B2 * | 6/2003 | Krauss | 403/49 |
| 7,530,540 B2 * | 5/2009 | Long et al. | 248/230.1 |
| 2002/0094228 A1 | 7/2002 | Krauss | |
| 2003/0194265 A1 | 10/2003 | Krauss | |

* cited by examiner

CLAMP

BACKGROUND OF THE INVENTION

This invention relates to a clamp, and more particularly to a clamp for connecting and supporting structural components of a playground assembly.

A playground assembly generally comprises a plurality of vertical posts that support horizontal members, such as walkways, platforms and other components. The horizontal members are connected to the posts in a manner that allows connection in many angular positions and is not necessarily limited to a perpendicular connection in order to facilitate the use of the unique playground accessories that one sees in a modern playground. The clamp must be easily installed, require little or no orientation and be sufficiently strong to support a heavy accessory without movement.

SUMMARY OF INVENTION

A benefit of the subject invention is a new and improved clamp for the connection and support of horizontal members to the vertical posts of a playground assembly.

A further benefit of the subject invention is a new and improved clamp that is easy to install.

A still further benefit of the subject invention is a new and improved clamp that allows the support of one or more horizontal members in different angular positions.

These and other benefits are found in the subject invention in which two halves of an annular ring are hingedly connected at one end and capable of being securely fastened to each other at the opposite end. The annular ring is sized to fit tightly around a vertical support post. An upper surface of the annular ring has an upper annular channel, while the lower surface of the annular ring has a lower annular channel. When the clamp is fixed to the vertical support post, a horizontal support adaptor may fit into both the upper and lower annular channels. A resilient engagement strip or button on the adaptor is placed into contact with the lower annular channel in this position and frictionally engages the lower annular channel to prevent lateral movement of the adaptor on the annular ring until such time as the adaptor may be securely attached to the vertical support post by a suitable fastener.

CONCISE DESCRIPTION OF THE DRAWINGS

The present invention will be readily apparent from the following detailed description of the invention and the appended claims, when taken in conjunction with the accompanying drawings, in which:

DETAILED DESCRIPTION OF THE SEVERAL EMBODIMENTS OF THE INVENTION

Figure 2:
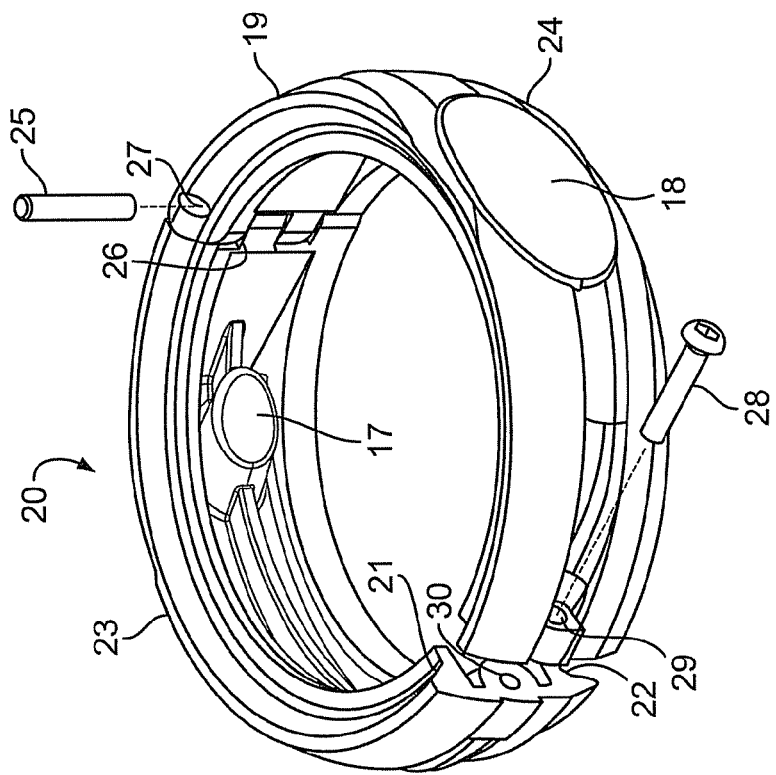
FIG. 2 is a perspective of the clamp of the subject invention.

While the present invention is susceptible of embodiment in various forms, there is shown in the drawings and will hereinafter be described, a presently preferred embodiment with the understanding that the present disclosure is to be considered an exemplification of the invention and is not intended to limit the invention to the specific embodiment illustrated.

Figure 1:
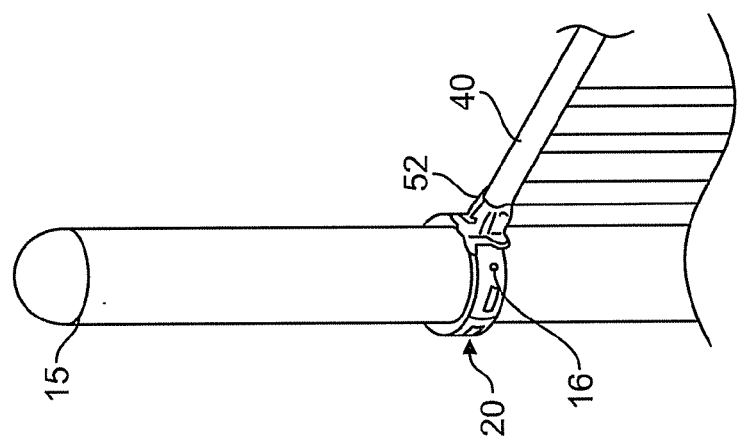
FIG. 1 is a perspective view of the clamp of the subject invention in use on a post supporting playground equipment.
Figure 3:
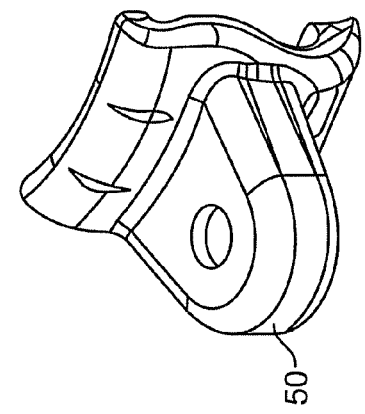
FIG. 3 is a front perspective of a panel support adaptor for use with the clamp of FIG. 2.
Figure 4:
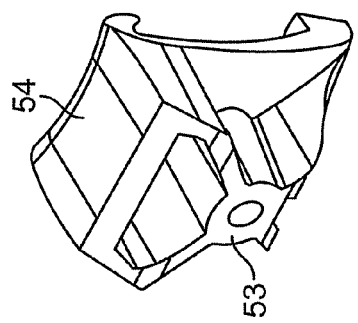
FIG. 4 is a front perspective of a vertical support adaptor for use with the clamp of FIG. 2.
Figure 5:
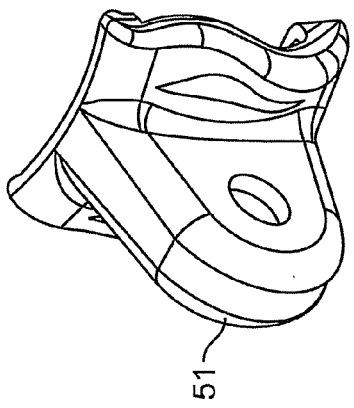
FIG. 5 is a front perspective of a tube support adaptor for use with the clamp of FIG. 2.
Figure 6:
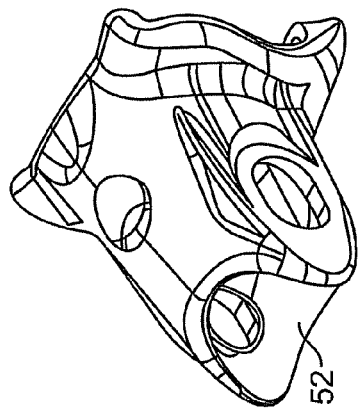
FIG. 6 is a front perspective of a deck support adaptor for use with the clamp of FIG. 2.
Figure 7:
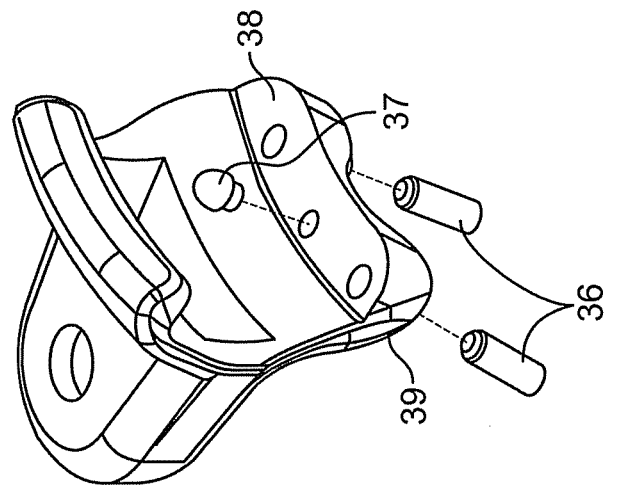
FIG. 7 is a rear perspective view of the vertical support adaptor of FIG. 4, showing the structure for affixing to the clamp.

Referring now to FIG. 1, there is shown a generally cylindrical post 15 about which a clamp 20 is affixed. The clamp 20 has a one piece tube support adaptor 52 secured to it for supporting an attachment, which in one embodiment is a tube or elongate cylindrical support bar 40. The clamp is generally cast metal, preferably steel or aluminum. Tube 40 represents a variety of components used in playground equipment and may take a variety of forms. Each different form may require a different adapter as will be explained.

Clamp 20 is shown in more detail in FIG. 2 and comprises two ring halves 23 and 24 that form a ring 19 with an upper channel 21 and a lower channel 22. On an exterior face of the clamp 20 may be an area 18 for exhibiting a logo or the like. The clamp 20 may comprise two parts 23 and 24 hingedly connected at one end by pin 25 through mating openings 26 and 27 respectively in the two parts 23 and 24. Each clamp part 23 and 24 has identical upper channels 21 and identical lower channels 22. At the opposing ends of each part, a threaded fastener such as a screw 28 extends through opening 29 on the one end into threaded opening 30 on the other end for threaded engagement therein. The screw may be self-threading, or the opening 30 may be threaded to accept the screw. Alternatively, a nut may be used to engage with and tighten on the screw and hold the clamp on the post. The clamp 20 is sized to fit about a given post at a desired height in tight engagement so that it will have sufficient strength to hold the clamp at that height and orientation.

The clamp 20 may be placed about a post at a desired height and orientation about the post and secured to the post at that desired height and orientation by suitable fastening.

A series of strengthened areas 17 indicate placement of the fasteners to secure the clamp 20 to the post in a fixed manner. Preferably there are four of these areas placed equidistantly about the clamp, so that regardless of the placement or number of adaptors, on the clamp ring 19, at least one or two areas 17 will always be available for insertion of a rivet or other fastener.

Figure 8:
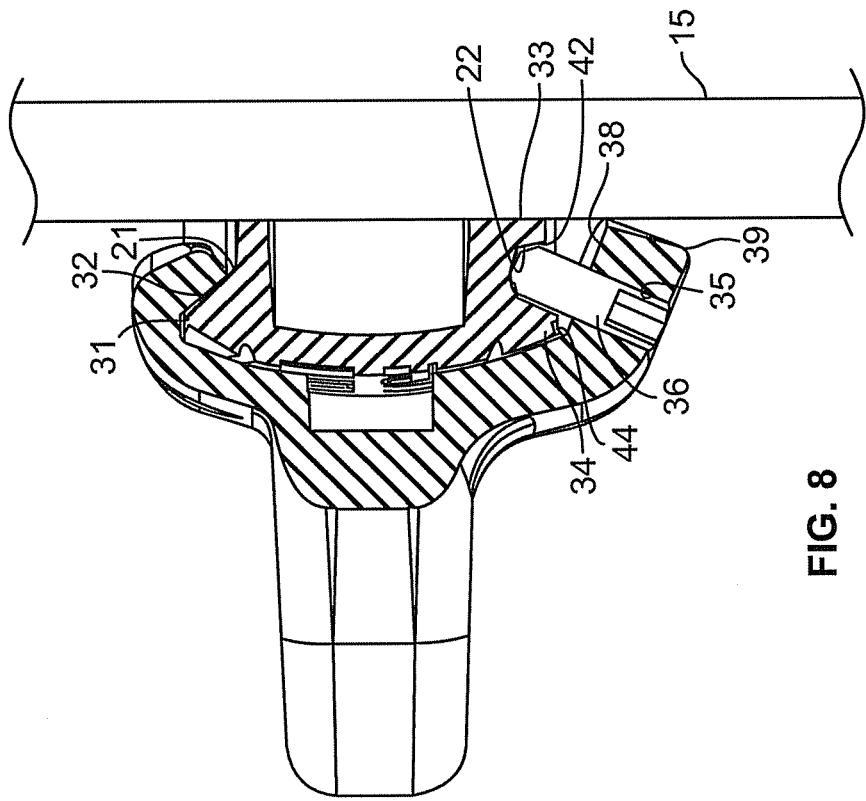
FIG. 8 is a cross-section of the vertical support adaptor of FIG. 4 when attached to the clamp of the subject invention.

The upper and lower channels 21 and 22 are shown in more detail in FIG. 8. Upper channel 21 has a ridge on projection 31 that a corresponding hook or clasp 32 from a support adaptor may engage in a clasping and or other latching and supporting relationship. Of course any other structure that will hold the two parts together while providing support for the adaptor and its supported components, such as mating hooks, or the like is possible. Lower channel 22 comprises a groove spaced from the inner clamp edge 33 at the post, and from the outer clamp edge 34. Thus, the groove terminates at an inner wall 46 spaced from the post. One or more setscrews 36 extends through opening 35 in lower supporting arm 39 of adaptor 50 and seats in lower channel 22. When tightened, to a torque of 20-59 in-lbs., the setscrew 36 secures the support adaptor 50 on clamp 20, and because the groove terminates at the lower wall which is spaced from the post, the post is not scratched, nor will the tightened set screw pull the clamp away from the post, or pull the adaptor 50 away from the clamp ring 19. Too much torque can warp the adaptor 50.

The adaptor may be secured first to the equipment component and then secured to the clamp ring, or the adaptor may be first secured to the clamp ring 19, after which the equipment component is secured to the adaptor. However, for adaptor 52, the component equipment must first be secured to the adaptor 52 and then to the clamp ring 19. The ability to place the adaptor on the clamp ring 19 last provides an installer with additional facility to make certain the adaptor and equipment are securely mounted to the post without excessive strain.

Figure 9:
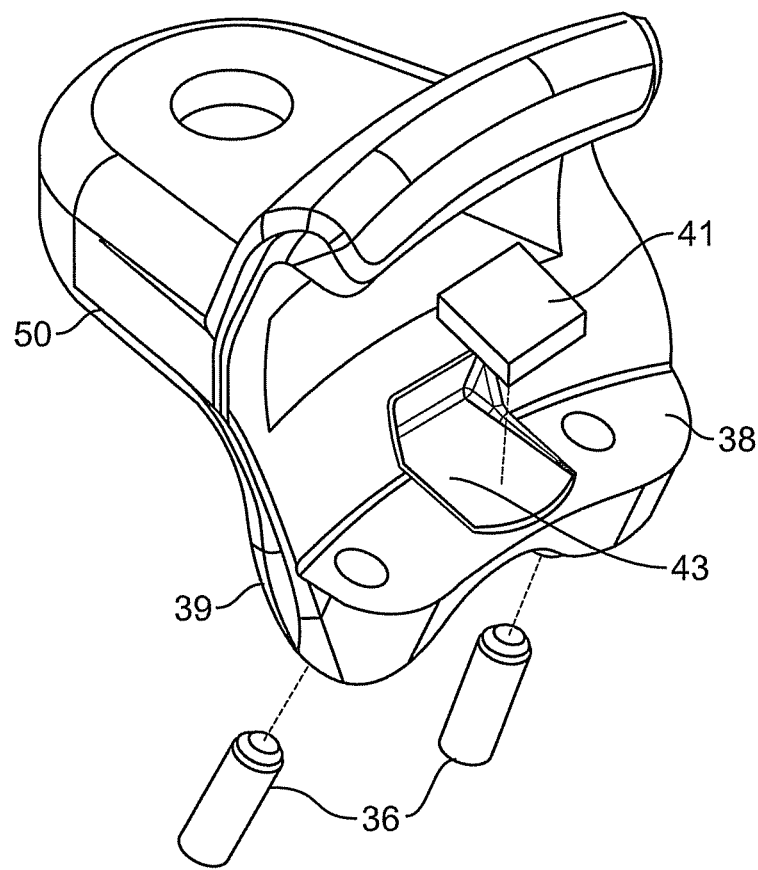
FIG. 9 is a rear perspective view of the vertical equipment adaptor of FIG. 4 with an alternative resilient engagement pad.

To install the support adaptor on the clamp, it is placed in a desired location, on the clamp, taking care to engage hook 32 with projection 31 first and then the support adaptor is allowed to swing down and lay loosely supported on the clamp. A strip or button 37 of resilient engagement material is located on upper engagement surface 42 of lower support arm 39 of the support adaptor. The resilient engagement button 37 may be rubber or plastic such as polyethylene, polypropylene or the like. Other possible materials are butadiene acrylonitrile, polychloroprene, fluorinated hydrocarbons, natural rubber, styrene butadiene rubber, polyurethane, isobutylene isoprene copolymer, epichlorohydrin, ethylene propylene rubber, and chlorosulfonated polyethylene. By frictionally engaging the lower clamp surface 44, the button serves to limit and stop movement of the support adaptor on the clamp when placed thereon. Thus the adaptor may be easily secured on the clamp in the exact radial location necessary without worry of the adaptor moving or sliding to a difference location during installation. The resilient engagement button 37 may be any shape, as shown in FIG. 9, where it is a square 41.

The resilient engagement button 37, or square 40, serves to hold the adaptor in the selected orientation before the setscrew 36 is tightened to secure it in the selected location on the clamp ring 19.

The various support adaptors that may be utilized with clamp 20 are shown in FIGS. 3-6. One or more of the support adaptors may be installed on a clamp 20, dependent on the playground components that are required to be supported in a given location. For instance if a panel is required, panel support adaptor 51 (FIG. 3) is used. When vertical support is necessary, vertical adaptor 50 (FIG. 4) is used. As depicted in FIG. 1, a tube adaptor 52 (FIG. 5) is used to support a hollow cylindrical support on a tube. A deck support adaptor 53 with a flat support surface 54, as known in the art, may be used to support a deck. A plurality of different adaptors may attach to a single clamp 20 at a common vertical height on post 15. Thus a plurality of playground components might be supported at the same height on the post.

The support adaptors 50-53 all have a hook 32 and a lower support arm 39 with setscrews; these hooks and arms interact with upper and lower channels 21 and 22 of the clamp similar to that shown in FIG. 8, and operate in a similar fashion.

The invention claimed is:

1. A clamp assembly for use in supporting a playground equipment component on a post comprising:
a ring mounted fixedly to a post at a desired height and rotational position;
said ring having upper and lower horizontal channels;
said upper horizontal channel comprising a ridge spaced from said post;
said lower horizontal channel comprising a groove spaced from said post, said groove having a groove wall, said groove wall spaced from said post; and
a one piece support adaptor engageable with said mounted ring so as to prevent movement of said support adaptor on said ring; said support adaptor having a hook for engagement with said upper horizontal channel;
said support adaptor having a set screw for engagement with said groove whereby said hook engages with said upper horizontal channel and said set screw seats in and bears against said groove wall and directly engages with said groove to fixedly secure the support adaptor to said clamp assembly for the support of said playground equipment component; and
said support adaptor having a lower supporting arm with an upper surface, and a resilient engagement material secured on said upper surface for engagement with said ring.

2. The clamp assembly of claim 1 wherein said resilient engagement material is a material selected from the group of polyethylene, polypropylene, butadiene acrylonitrile, polychloroprene, fluorinated hydrocarbons, natural rubber, styrene butadiene rubber, polyurethane, isobutylene isoprene copolymer, epichlorohydrin, ethylene propylene rubber, and chlorosulfonated polyethylene.

3. In combination:
a playground equipment component;
a support post;
an annular clamp assembly securely mounted to said post at a selected orientation and height;
a support adaptor;
said support adaptor having a lower supporting arm with an upper surface and a resilient engagement material secured on said upper surface for frictionally engaging said annular clamp assembly to inhibit movement of the support adaptor both during and after assembly;
said annular clamp assembly having an upper channel and a lower channel;
said lower channel being spaced from said post and having a channel wall spaced from said post;
a fastener threadedly supported within said support adaptor, seating within said lower channel and bearing against the channel wall for fastening said support adaptor to said annular clamp assembly, said support adaptor hanging from said upper channel and affixed to said lower channel to thereby rigidly secure said support adaptor to said clamp assembly on said post.

4. The combination of claim 3 wherein said upper channel comprises a ridge.

5. The combination of claim 3 wherein said lower channel comprises a groove.

6. The combination of claim 3 wherein said support adaptor is secured to said annular clamp assembly by a set screw.

7. The combination of claim 6 wherein said set screw is threadedly mounted in said lower supporting arm of said support adaptor and bears against said groove.

8. The combination of claim 3 wherein said resilient engagement material is a material selected from the group of polyethylene, polypropylene, butadiene acrylonitrile, polychloroprene, fluorinated hydrocarbons, natural rubber, styrene butadiene rubber, polyurethane, isobutylene isoprene copolymer, epichlorohydrin, ethylene propylene rubber, and chlorosulfonated polyethylene.

9. A clamp assembly for supporting a playground equipment component on a pole; comprising
an annular ring capable of being secured to said pole;
a support adaptor having a lower supporting arm with an upper surface and a resilient engagement material secured on said upper surface thereon for frictionally engaging said annular ring to inhibit lateral movement of said support adaptor on said annular ring both during and after assembly;

said annular ring having an upper channel and a lower channel;

said lower channel being spaced from said pole and having a channel wall spaced from said pole;

said support adaptor hanging from said upper channel and affixed to said lower channel by a fastener bearing against said channel wall to thereby rigidly secure said support adaptor to said annular ring on said pole.

10. The clamp assembly of claim 9 wherein said upper channel comprises a ridge.

11. The clamp assembly of claim 9 wherein said lower channel comprises a groove.

12. The clamp assembly of claim 9 wherein said support adaptor is secured to said annular ring by a set screw.

13. The clamp assembly of claim 9 wherein said resilient engagement material is a material selected from the group of polyethylene, polypropylene, butadiene acrylonitrile, polychloroprene, fluorinated hydrocarbons, natural rubber, styrene butadiene rubber, polyurethane, isobutylene isoprene copolymer, epichlorohydrin, ethylene propylene rubber, and chlorosulfonated polyethylene.

\* \* \* \* \*